S. M. VAUCLAIN.
DRIVING MECHANISM FOR MOTOR DRIVEN VEHICLES.
APPLICATION FILED JUNE 20, 1908.
922,367.
Patented May 18, 1909.
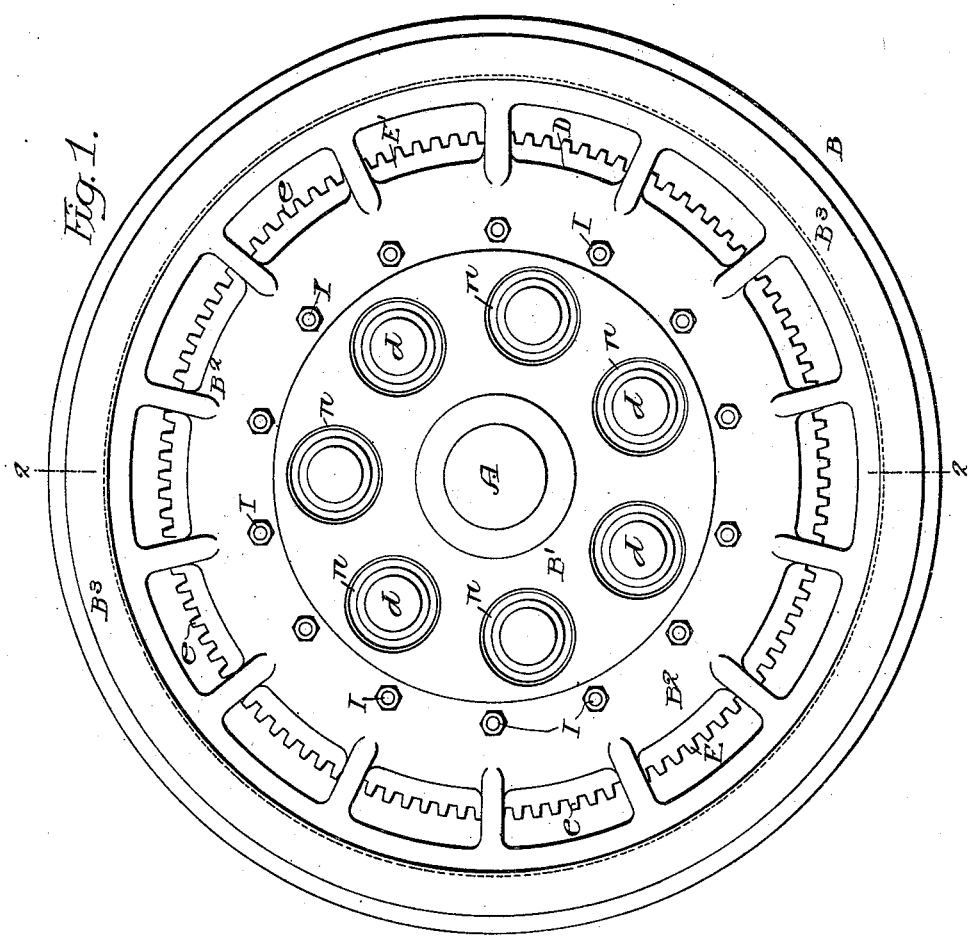
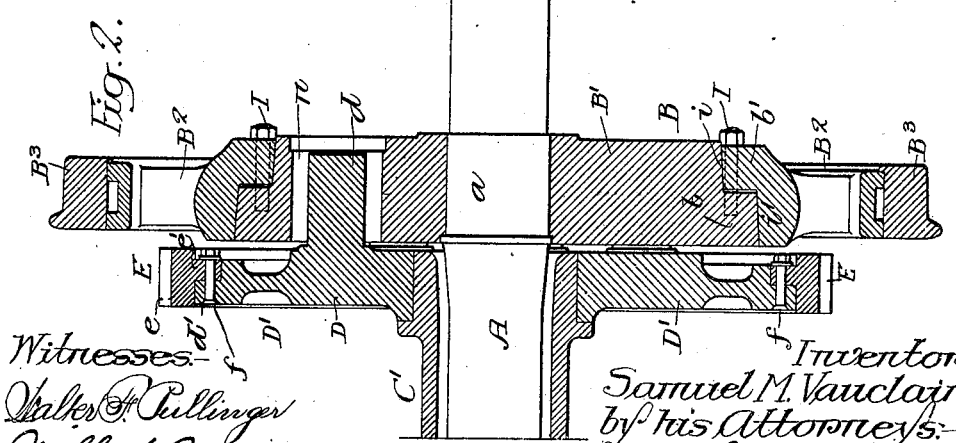
Witnesses:
Walter H. Pullinger
Willa H. Burrowes
Inventor:—
Samuel M. Vauclain,
by his Attorneys:—
Howson & Howson

UNITED STATES PATENT OFFICE.

SAMUEL M. VAUCLAIN, OF PHILADELPHIA, PENNSYLVANIA, ASSIGNOR TO BURNHAM, WILLIAMS & COMPANY, OF PHILADELPHIA, PENNSYLVANIA, A FIRM.

DRIVING MECHANISM FOR MOTOR-DRIVEN VEHICLES.

No, 922,367.     Specification of Letters Patent.     Patented May 18, 1909.

Application filed June 20, 1908. Serial No. 439,542.

*To all whom it may concern:*

Be it known that I, SAMUEL M. VAUCLAIN, a citizen of the United States, residing in Philadelphia, Pennsylvania, have invented certain Improvements in Driving Mechanism for Motor-Driven Vehicles, of which the following is a specification.

My invention relates to certain improvements in the driving mechanism of motor driven cars, particularly of the type in which the motor is geared to an axle on which are mounted the driving or traction wheels. In this type of car there is usually a large gear wheel adjacent to the driving or traction wheel and the motor is hung from the axle on a sleeve inclosing the axle, and this driving gear meshes with the pinion on the armature shaft of the motor, if the motor is an electric motor.

The object of my invention is to provide means for readily replacing the toothed portion of the gear wheel without removing the entire driving or traction wheel from the axle. This object I attain in the following manner, reference being had to the accompanying drawing, in which:—

Figure 1, is a face view of a driving or traction wheel illustrating my invention; and Fig. 2, is a sectional view on the line 2—2, Fig. 1.

A is the axle and C is a tubular shaft inclosing the axle and on which is mounted the gear wheel D.

B is a driving or traction wheel having a center section B' driven onto the portion $a$ of the axle and secured to this center B' is a rim section $B^2$ and mounted on the periphery of the rim section is the flanged tire $B^3$. The rim section may be secured to the center section in any suitable manner. In the present instance the center section has an external flange $b$ and the other section has an internal flange $b'$. The surfaces $i$ and $i'$ are slightly tapered so that one part will fit snugly into the other part. Stud bolts I are arranged at suitable intervals extending through the flange of the rim section $B^2$ and into the flange of the center section, as clearly illustrated in Fig. 2. By removing the nuts on the bolts I the rim section can be detached from the center section.

The gear wheel D is made in two sections; the center D' and the rim E which has teeth $e$ meshing with the teeth of a pinion on the armature shaft. The rim section E has an internal flange $e'$ and the center section D' has a flange $d'$ and a series of transverse bolts pass through the two flanges, fastening the two toothed rim sections rigidly to the center section.

It will be noticed that the center section D' of the gear wheel is greater in diameter than the center section of the driving or traction wheel B. The object of this construction is to provide for the removal of the rim section E when the rim section $B^2$ of the wheel B is detached, so that neither center section need be removed to replace the teeth of the gear wheel.

In the present instance there is a series of transverse openings $n$ in the center section B' of the wheel B and on the center section of the wheel D is a series of pins $d$ which extend into these openings. Any suitable yielding material is placed between the walls of the openings $n$ and the pins so as to absorb the shock when the motor is started or stopped. This, however, forms no part of my invention, as in some instances the center section D' of the wheel D may be mounted directly upon the axle instead of on a hollow shaft.

The object of the present invention, as remarked above, is to provide for the removal of the toothed rim of the gear wheel from the axle, as it is difficult to replace a driving wheel on an axle after it is once driven in position, whereas if the center B' is firmly driven in position on the axle and the rim section is detachably secured to the center by a series of bolts, these bolts or their nuts can be readily removed and the rim detached. By making the joint between the two sections of the wheel slightly tapered a neat fit of the rim section on the center is assured.

I claim:—

1. The combination of two adjacent wheels, each having an independent center section and a rim section, means connecting the center section of the wheels, the center section of the inside wheel being slightly greater in diameter than the center section of the outside wheel, so that when the rim section of the outside wheel is removed the rim section of the inside wheel can be removed over the center section of the outside wheel without disturbing the center sections and their connection.

2. The combination of two adjacent wheels, each wheel having a center and a rim, one center being coupled to the other center, the center of the inside wheel being greater in diameter than that of the outside wheel, each center having an internal peripheral flange and each rim having an internal flange overlapping the peripheral flange of the center, and transverse bolts securing the rims to the centers so that on the removal of the rim of the outside wheel the rim of the inside wheel can be detached from its center and removed over the center of the outside wheel without disturbing the center of either wheel.

3. The combination of an axle, a hollow shaft mounted upon the axle, a gear wheel mounted on the hollow shaft, a traction wheel mounted on the axle, means connecting the gear wheel with the traction wheel, said gear wheel having a center section and a flange section, the center section being mounted on the hollow shaft, transverse bolts securing the rim section to the center section, a traction wheel made in two parts having a center rigidly secured to the axle, and transverse bolts securing the rim section to the center section, the center of the inner wheel being greater in diameter than the center of the outer wheel, so that the rim of the inner wheel can be removed over the center of the outer wheel after the rim of the outer wheel has been detached.

4. The combination of two adjacent wheels, the inside wheel having a removable toothed rim section and the center section of the outside wheel being secured rigidly to the shaft and having a peripheral flange, a rim section of the outside wheel secured to the center section and having an internal flange overlapping the flange of the center, the two parts being beveled so that one will fit snugly upon the other, and transverse bolts tending to draw the two flanges together, thus rigidly connecting the parts.

In testimony whereof, I have signed my name to this specification, in the presence of two subscribing witnesses.

SAMUEL M. VAUCLAIN.

Witnesses:
A. H. EHLE,
H. V. WILLE.